(12) United States Patent
Guerry et al.

(10) Patent No.: US 11,674,481 B2
(45) Date of Patent: Jun. 13, 2023

(54) ACOUSTIC RESONATOR

(71) Applicant: AKWEL, Champfromier (FR)

(72) Inventors: Pascal Guerry, Seppois-le-haut (FR); Adrien Eustache, Port (FR); Michel Robinault, Sene (FR)

(73) Assignee: AKWEL, Champfromier (FR)

( * ) Notice: Subject to any disclaimer, the term of this patent is extended or adjusted under 35 U.S.C. 154(b) by 286 days.

(21) Appl. No.: 16/782,722

(22) Filed: Feb. 5, 2020

(65) Prior Publication Data
US 2020/0248660 A1    Aug. 6, 2020

(30) Foreign Application Priority Data
Feb. 5, 2019 (FR) ...................... 1901098

(51) Int. Cl.
*F02M 35/12* (2006.01)

(52) U.S. Cl.
CPC .... *F02M 35/1266* (2013.01); *F02M 35/1216* (2013.01)

(58) Field of Classification Search
CPC .. F01N 1/02; F01N 1/026; F01N 1/04; F02M 35/1216; F02M 35/1266
See application file for complete search history.

(56) References Cited

U.S. PATENT DOCUMENTS

| | | |
|---|---|---|
| 2016/0201621 A1 | 7/2016 | Grieswald et al. |
| 2020/0141372 A1* | 5/2020 | Choi ................ F02M 35/1211 |

FOREIGN PATENT DOCUMENTS

| | | | | |
|---|---|---|---|---|
| DE | 199 43 246 A1 | | 3/2001 | |
| DE | 19943246 A1 | * | 3/2001 | ......... F02M 35/1216 |
| EP | 1 416 148 A2 | | 5/2004 | |
| EP | 3647582 A1 | * | 5/2020 | ......... F02M 35/1266 |
| FR | 1251396 A | * | 1/1961 | ......... F02M 35/1255 |

OTHER PUBLICATIONS

Machine Translation of DE19943246A1 PDF file Name: "DE19943246A1_Machine_Translation.pdf".*
Machine Translation of FR1251396A PDF file Name: "FR1251396A_Machine_Translation.pdf".*

* cited by examiner

*Primary Examiner* — Grant Moubry
*Assistant Examiner* — Ruben Picon-Feliciano
(74) *Attorney, Agent, or Firm* — Oliff PLC

(57) ABSTRACT

The resonator is configured to attenuate the noise in a duct delimiting an internal channel for the flow of a fluid according to a reference axis, of the type including an annular compartment configured to extend around the channel and provided with at least one orifice forming a neck for communication with the flow channel so as to form a resonance chamber. Accordingly, the compartment has an inner structure with a geometry shaped so as to produce a revolution annular asymmetry of the resonance chamber about the reference axis, adapted to generate a phase shift of an acoustic pressure wave reflected inside the chamber relative to an acoustic pressure wave incident from the main flow.

11 Claims, 13 Drawing Sheets

ACOUSTIC RESONATOR

TECHNICAL FIELD

The present invention concerns an acoustic resonator adapted to be mounted in a duct for the flow of a fluid, more particularly a gaseous fluid, and more specifically in an intake and/or exhaust gas flow duct in an internal combustion engine vehicle. It also concerns a duct comprising such an acoustic resonator.

The invention applies more particularly but not exclusively to the technical field of heat engines equipped with a turbocharger for compressing the intake air.

In a manner known per se, many gasoline engine or diesel engine motor vehicles are equipped with a turbocharger constituted by a first turbine driven by the exhaust gases of the engine and which rotates a second turbine mounted on the same shaft and compressing the air or the air/gasoline mixture before entering the engine.

Such an assembly has the advantage of allowing substantially increasing the power of the engine, but the speed of rotation of the turbine of the turbocharger generates noise over a wider range of potentially harmful sound frequencies.

It is known to attenuate the sound frequencies over a wide spectrum thanks to appropriate acoustic resonators or dampers, generally positioned between the turbocharger and the internal combustion engine in an intake duct.

An acoustic resonator may operate according to different attenuation principles: attenuation of the pressure waves by interference, by Helmholtz principle, etc.

In particular, a first principle is the principle of the Helmholtz resonator. Such a resonator is generally constituted by a cavity which communicates with the external medium, herein the intake duct, generally by a narrow orifice, commonly designated as neck. The elasticity of the gas volume inside the chamber in combination with the mass of inertia of the gas contained in the neck replicates a mass-spring mechanical system with a particular resonance frequency, called natural frequency. When an acoustic pressure acts on the neck, this acoustic pressure tends to vibrate the air mass contained in the chamber at a certain frequency which depends on its volume, the height and the section of the neck. Thanks to this natural resonance, the noise can be effectively reduced, in particular by adapting the natural frequency of the resonator to the frequency of the known noise source.

Furthermore, a second known principle is the principle of the interference resonator. Such a resonator is configured to generate a stationary wave in an elongated volume such as a tube connected to the external medium, herein the intake duct. According to this principle, when an acoustic wave enters the tube from the conduit, the pressure wave propagates inside and along this tube and then returns to the intake duct with a phase shift. The path traveled by the wave inside the tube will generate a phase shift of the pressure wave exiting the tube relative to the pressure wave entering the tube which will produce a reflection of the incident pressure wave. The stationary wave is the superimposition of two progressive waves of opposite directions of propagation: the resonance frequencies of these superimposed progressive waves correspond to the most attenuated frequencies.

It may be desirable to combine these two «interference» type and «Helmholtz» type acoustic attenuation principles with relatively close resonance frequencies in order to optimize the width of the dampening range of the sound frequencies. The difficulty lies in the fact that these two principles require, in order to operate optimally, shapes that are different and not necessarily compatible with each other.

It is thus desirable in order to optimize the «Helmholtz» type resonator, to provide a slightly elongated restricted volume extending in the vicinity of the neck to limit the phase shift. On the contrary, it is preferable to provide an elongated volume for an «interference» type resonator, so that the pressure wave could propagate with a significant phase shift.

Yet, these two antagonistic requirements are difficult to implement in the same resonator.

PRIOR ART

It is already known from the prior art, in particular from the document FR 2 489 881, an exhaust silencer for an internal combustion engine. In order to combine several acoustic attenuation principles: reflection, interference, absorption and thus best cover the frequency range of the spectrum depending on the relative magnitude of the different components, the silencer described in this document includes several attenuation stages. Such an arrangement has proved to be particularly bulky.

There is a need to provide an acoustic attenuation means allowing reducing the noise originating from the operation of the turbocharger with minimal bulk while increasing the damping range.

SUMMARY OF THE INVENTION

To this end, the invention relates to a resonator for attenuating noise in a duct delimiting an internal channel for the flow of a fluid according to a reference axis, of the type comprising an annular compartment configured to extend around the channel which delimits an annular resonance cavity and at least one orifice forming a neck for communicating the cavity with the flow channel, the orifice extending longitudinally in the circumferential direction, characterized in that the compartment has an inner structure with a geometry shaped so as to produce a revolution asymmetry of the internal volume of the annular compartment about the reference axis, adapted to generate a phase shift of an acoustic pressure wave propagating in the cavity relative to an acoustic pressure wave propagating in the channel.

The two «interference» type and «Helmholtz» type resonator principles require different hardly compatible shapes within the same resonator without considerably increasing the bulk of the overall resonator.

Indeed, for the interference type resonator, a planar wave should be able to propagate along a tube whereas for the Helmholtz type resonator, the volume serving as a spring (mechanical analogy) should not be too far away from the neck in order to react without phase shift.

With a slot-shaped communication orifice along its circumference, the resonator behaves like a Helmholtz resonator because the different volume points of the compartment do not feature any phase difference therebetween. With the introduction of a revolution asymmetry of the annular volume of the compartment about the reference axis, the resonator also behaves like an interference resonator because the asymmetry will generate a phase shift along this circumference.

Thanks to the invention, the resonator can produce both a Helmholtz effect and an interference effect and that without requiring additional bulk and while providing a large dampening range.

A resonator according to the invention may further include one or more of the features detailed hereinafter.

In a preferred embodiment of the invention, the orifice is formed by an almost-circumferential or circumferential slot along the perimeter of the fluid flow channel.

In another preferred embodiment of the invention, the orifice has a radial thickness, designated by the height of the neck, this height of the neck being angularly variable.

In another preferred embodiment of the invention, the neck comprises a horn between a throat to which the chamber is connected and a mouth open onto the flow channel, the shape of the horn defines an expansion function with its section increasing between the throat and the mouth, in particular a linear, exponential, conical or any function.

In another preferred embodiment of the invention, the inner structure comprises at least one generally radially protruding annular wall and shaped so as to produce the revolution asymmetry.

In another preferred embodiment of the invention, the annular wall is an annular rib protruding radially inwards the cavity axially delimiting a side of the orifice and having an inclination with respect to a radial plane orthogonal to the reference axis.

In another preferred embodiment of the invention, the annular wall is an axial end wall of the chamber which extends obliquely at a non-zero angle α with a radial plane orthogonal to the reference axis.

In another preferred embodiment of the invention, the resonator comprises a generally tubular insert member around the reference axis intended to be inserted inside the duct which delimits, internally, the fluid flow channel and, externally, with the duct, a space comprising the annular compartment.

In another preferred embodiment of the invention, the insert member has a tubular intermediate portion and end portions which are respectively convergent and divergent to and from the intermediate portion.

In another preferred embodiment of the invention, the resonator comprises two respectively proximal and distal walls to axially close the cavity, the two walls being formed by the same continuous helical wall.

In another preferred embodiment of the invention, the helical wall completes at least one turn.

In another preferred embodiment of the invention, the helical wall delimits a closed helical volume in a winding direction of the helix by end walls.

In another preferred embodiment of the invention, the resonator comprises a plurality of adjacent annular compartments delimiting a plurality of adjacent resonator chambers formed in the axial direction, each being connected to the flow channel by at least one communication orifice.

BRIEF DESCRIPTION OF THE DRAWINGS

Other features and advantages of the invention will become apparent in light of the following description, made with reference to the appended drawings in which.

DESCRIPTION OF THE EMBODIMENTS

Figure 1:
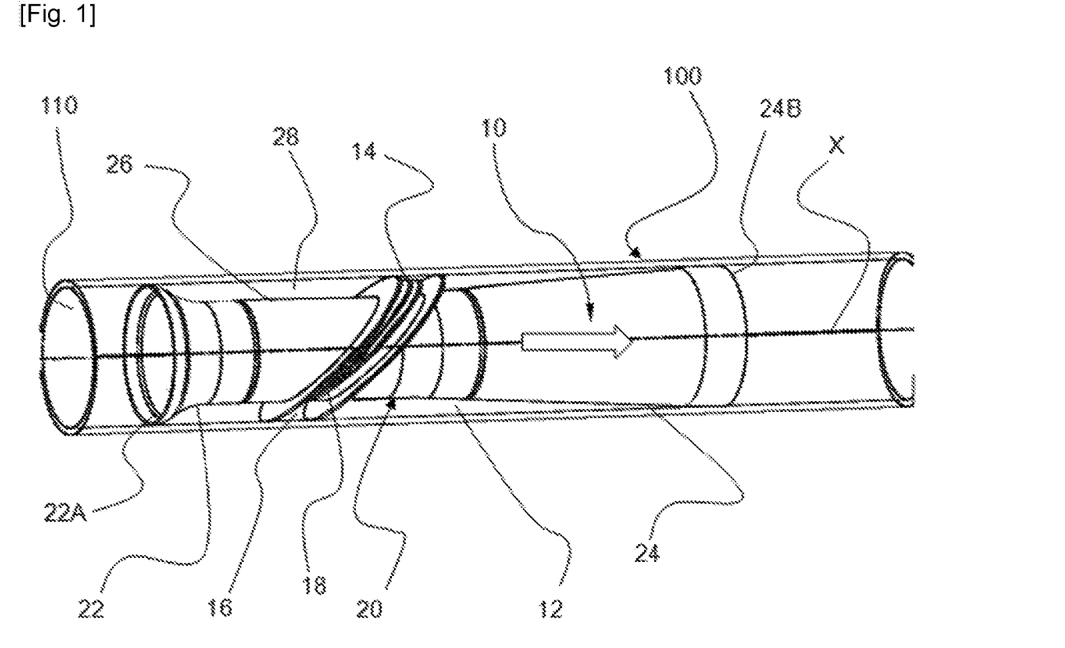
FIG. 1 is a perspective view of an acoustic resonator mounted inside a duct according to a first embodiment of the invention.

An acoustic resonator intended to attenuate noise is represented in FIG. 1 according to a first embodiment of the invention. This resonator is designated by the general reference 10.

The invention applies more particularly, but not exclusively, to the attenuation of an acoustic disturbance inside a duct 100 for the flow of a fluid, for example the flow of an intake and/or exhaust gas. This duct 100 is preferably substantially tubular and with a reference axis X. Of course, alternatively, the duct 100 may comprise different shapes, such as a bent or «S»-shaped tubular shape, etc.

For example, the duct 100 is an air intake duct of an air intake system of an internal combustion engine of a motor vehicle. This duct 100 delimits an internal channel 110 for the flow of a fluid with a reference axis X and with a substantially tubular general shape about this axis X.

In the first embodiment illustrated in FIG. 1, the resonator 10 is mounted to the duct 100 and comprises an annular compartment 12 configured to extend around the flow channel 110. This annular compartment 12 delimits a resonance cavity 16 and is provided with at least one orifice 14 forming a neck for communicating the cavity 16 with the flow channel 110. This neck 14 thus generates a fluid flow from the channel 110 to the cavity 16 at the origin of a resonance phenomenon capable of attenuating some sound frequencies as will be described hereinafter. The cavity 16 and the neck 14 thus form a resonator.

Preferably, the neck 14 comprises a horn between a throat to which the cavity 16 is connected and a mouth open onto the flow channel 110, the shape of the horn defines an expansion function with its section increasing between the throat and the mouth, in particular a linear, exponential, conical or any function.

In the first embodiment illustrated in FIG. 1 as well as in all of the embodiments exposed and illustrated in the present description, the annular compartment 12 extends inside the duct 100. Indeed, as illustrated in FIG. 1, the acoustic resonator 10 is inserted coaxially and radially inside the duct 100. The resonator 10 is thus designed as an insert 20 which is manufactured separately from the duct 100 and inserted during assembly inside the duct 100. Alternatively, of course, the annular compartment 12 of the resonator 10 may be mounted outside the duct 100 around the outer wall of the duct, as described for example in the document EP 3,042, 064.

In this example, the insert 20 has a generally tubular shape having substantially flared end portions 22 and 24 which confers to the insert 20 a hyperboloid general shape. Thus, the insert 20 comprises, in this exemplary embodiment, a substantially frustoconical convergent upstream segment 22 whose circular-shaped upstream end 22A is mounted in tight contact with the inner wall of the duct 100. The insert 20 further comprises a cylindrical intermediate segment 26 arranged coaxially with the duct 100 and a substantially frustoconical downstream segment 24 which diverges from the central segment 26 and which terminates in a downstream end 24B also mounted in tight contact with the inner wall of the duct 100. The insert 20 may be formed for example by two parts possibly interconnected and held inside the duct 100 by adhesion at the location of the upstream 22A and downstream 24B ends.

Thus, as shown in the example illustrated in FIG. 1, the body of the resonator locally delimits thereinside a flow narrowed section portion of the channel 110. It should also be noted that the respectively convergent 22 and divergent 24 sections (viewed in the direction of flow of the fluid) which are formed on either side of the generally cylindrical intermediate segment 26 of the resonator 10 allow reducing the pressure drops during the flow of the fluid in the duct. The insert 20 delimits, in a manner known per se, in this example a Venturi-shape, optimized to limit the pressure drop in the flow direction (convergence angle smaller than 30° and divergence angle smaller than 7°).

The terms «convergent» and «divergent» respectively mean in the present description any narrowing and widening of a passage section conferring to the considered section a geometry for example a frustoconical or flared geometry (for example substantially in the shape of a hyperboloid of revolution).

The insert 20 and the duct 100 then defines an annular volume 28 communicating with the fluid flow channel 110, inside which the annular compartment 12 extends. This annular compartment 12 comprises an orifice 14 forming a neck in order to communicate the flow channel and the resonance cavity 16.

Preferably, the orifice 14 is in the form of a slot extending generally longitudinally in the circumferential direction, that is to say in a direction tangent to a circle centered on the reference axis X. Alternatively, the slot may extend slightly offset or oblique with respect to this circumferential direction.

When the annular compartment 12 includes only one single orifice 14 in the form of a slot, the slot may advantageously be locally interrupted by one or more bridge(s) of material ensuring the structural continuity (almost-circumferential slot).

The slot may form a continuous orifice in the longitudinal direction without interruption or may have interruptions. In particular, preferably, in order to facilitate the manufacture in one-piece of the insert member 20, the slot may extend over only one portion of the circumference.

Figure 3:
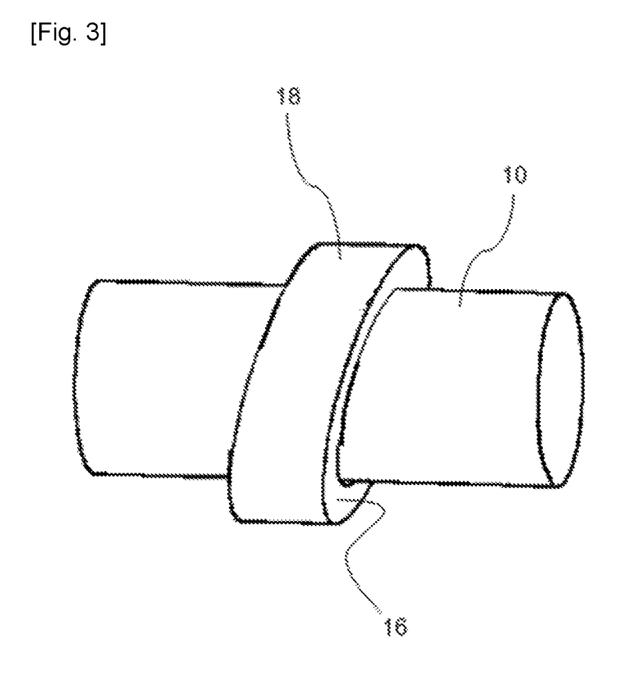
FIG. 3 is a schematic view of the volume of a resonance chamber of the resonator of FIGS. 1 and 2.

In accordance with the invention and as illustrated for example in FIG. 3, the compartment 12 has an inner structure 18 with a geometry shaped so as to produce a revolution asymmetry of the volume of the resonance cavity 16 about the reference axis X.

Figure 2:
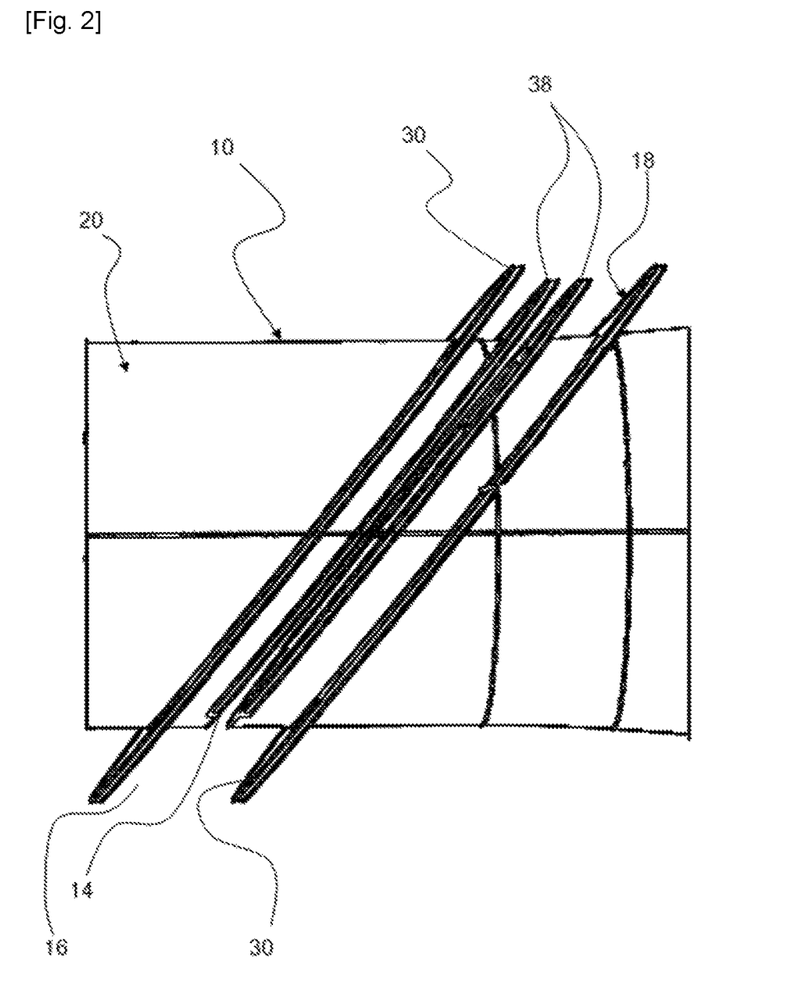
FIG. 2 is a partial and detailed view on an enlarged scale of the acoustic resonator of FIG. 1.

In the first embodiment and as illustrated in FIG. 2, the geometric inner structure 18 comprises at least one annular wall 30 of with an annular general shape shaped so as to produce the revolution asymmetry. This annular wall 30 preferably extends radially outwards according to a substantially oblique orientation with respect to a reference plane orthogonal to the reference axis X at an angle α. For example, the angle α is comprised between 0° and 80°.

In the example illustrated in FIG. 2, this wall 30 is an axial end wall of the cavity 16 which extends obliquely at a non-zero angle α with a radial plane orthogonal to the axis of reference X. In the example illustrated in FIGS. 1 and 2, the inner structure 18 comprises two annular walls 30 extending in an oblique direction and which axially close the resonance chamber 16 on either side in the axial direction. The two annular walls 30 extend in this example in a parallel manner. As illustrated in FIG. 3, the volume of the chamber 16 thus obtained comprises a geometry 18 with an annular asymmetry revolution.

Thanks to this revolution asymmetry, in addition to a Helmholtz type resonance phenomenon due to the presence of the neck 14 and the resonance cavity 16, the volume revolution asymmetry is capable of introducing a circumferential phase shift of an acoustic pressure wave reflected inside the cavity 16 relative to an incident acoustic pressure wave of the main flow. This introduced phase shift allows creating an interference-type resonance phenomenon between the acoustic pressure wave propagating in the main flow and the acoustic pressure wave reflected after propagation inside the resonance chamber 16 of the invention.

FIGS. 4 to 7 illustrate a simplified modeling of the operating principle of the resonator 10 of this first embodiment. This modeling is based on an analogy with a mass-spring type mechanical system.

The Helmholtz resonator effect can be compared to a mass-spring system, in which the mass is the air driven in the neck 14 and the spring is the air in the much larger volume of the cavity 16. As with any Helmholtz resonator, this acoustic resonator has a natural frequency, for which the absorption of acoustic energy is maximum.

In order to model the operating principle of this resonator 10, the volume of the resonance chamber 16 is cut by volume discretization. The circumferential slot neck 14 is represented by a continuous succession of elementary air volumes forming the masses m and the cavity 16 is represented by a succession of elementary volumes forming the springs with stiffness k. The modeling of the resonator 10 therefore comprises a plurality of elementary mass-spring systems regularly distributed circumferentially.

Figure 4:
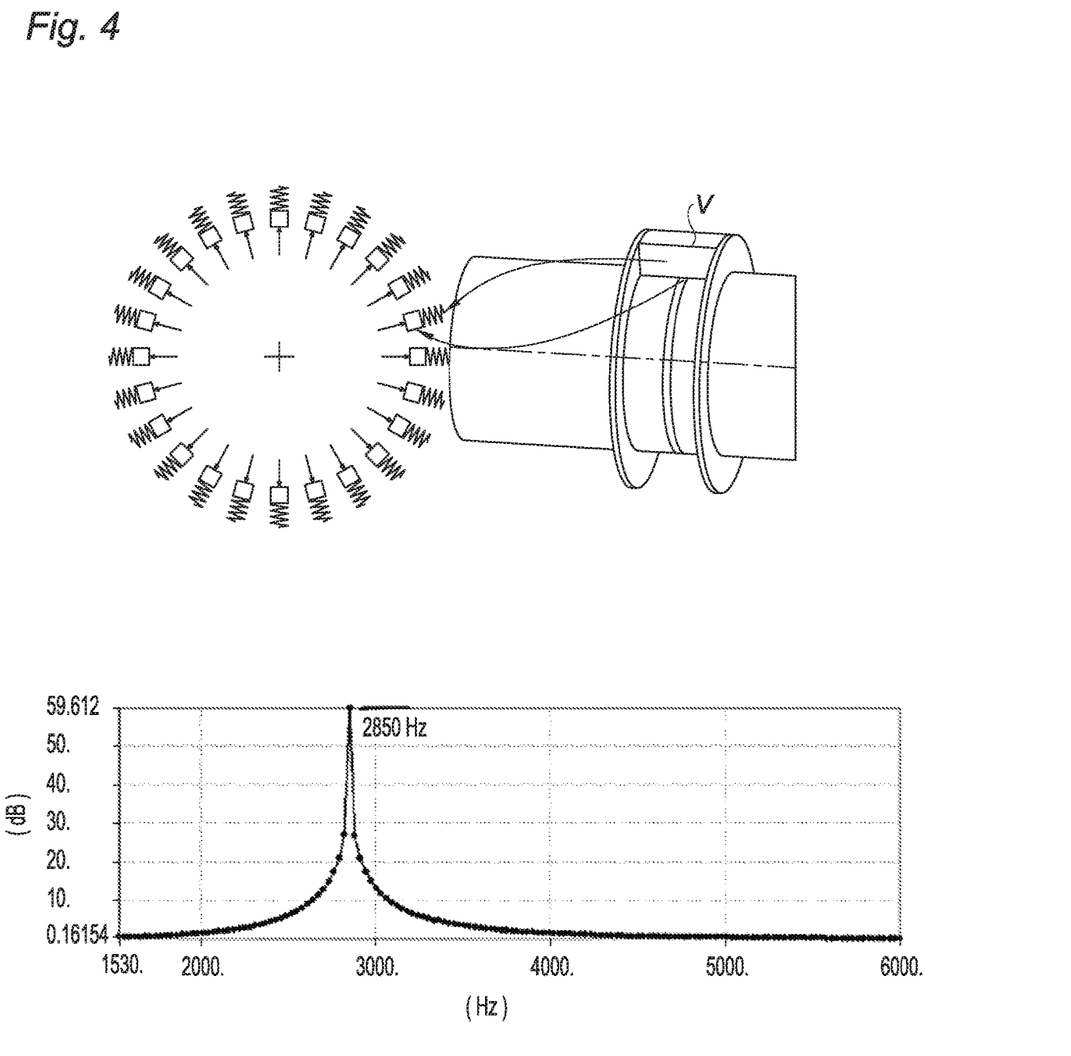
FIG. 4 represents a modeling of an operating principle through a mechanical analogy of a first resonator configuration and represents a graph representing the dampening in decibel as a function of the frequency in Hertz of the modeled resonator.

As regards the first modeling of FIG. 4, the resonator 10 comprises a compartment 12 with a symmetrical volume of revolution about the axis X, the forces exerted on the masses m are identical and the stiffnesses k of the springs are also identical because the elementary volumes V are identical over the entire periphery. In this case, the masses oscillate at the same time and this results in a Helmholtz-type main resonance phenomenon, as shown in the graph of this same figure. In this case, the resonance phenomenon results in a main peak at 2850 Hz.

Figure 5:
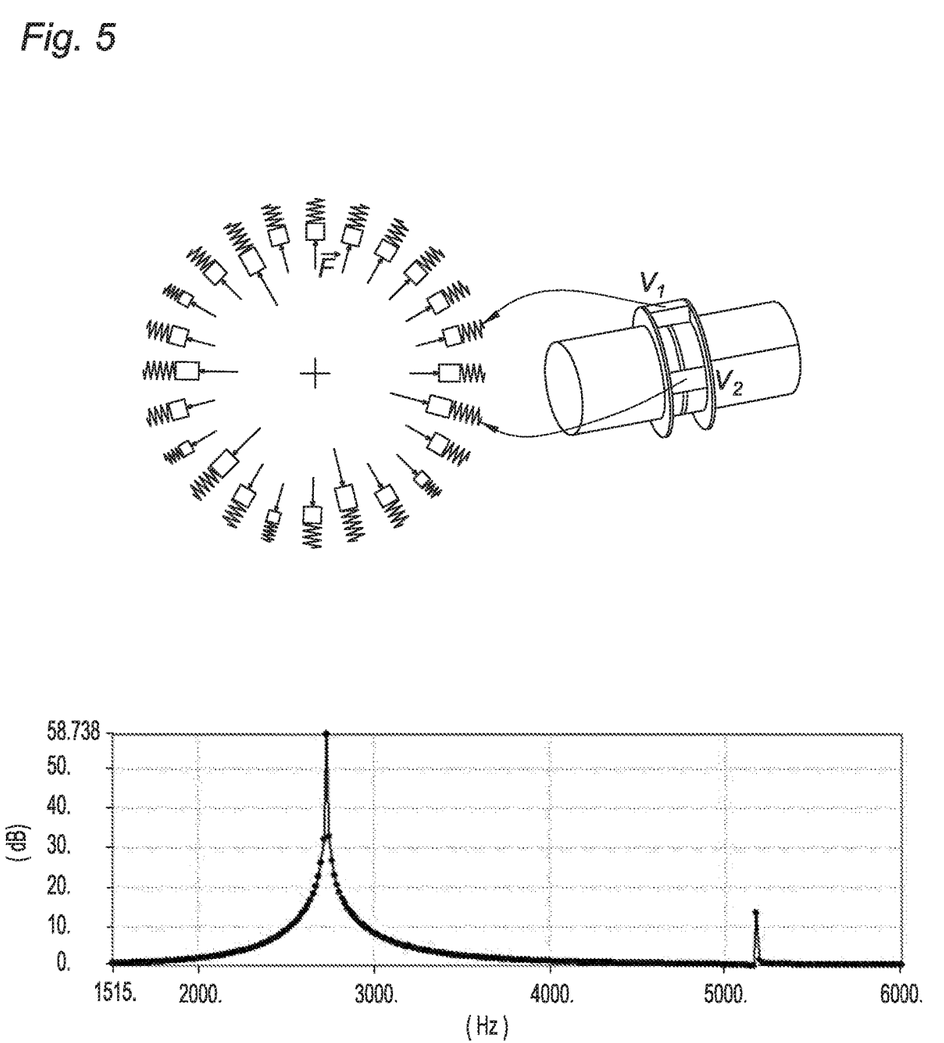
FIG. 5 represents a modeling in accordance with FIG. 4 of a second resonator configuration and the corresponding graph.

As regards the second modeling illustrated in FIG. 5, the resonator 10 has a volume asymmetry about the reference axis X, in particular because the walls 30 of the compartment 12 are inclined. In this modeling, the slot 14 is circumferential and non-inclined. The volume of the resonance chamber 16 has a revolution asymmetry as illustrated in particular in FIG. 3. In particular, the elementary cavity volumes V1 and V2 do not have the same shape along the circumference. The stiffness k of the springs of the elementary volumes being not the same because the elementary volumes do not have the same shapes, the masses m will not oscillate in the same way under the effect of the same force. These differences in stiffness k will cause the apparition of a wave propagating along the annular chamber 16 with a phase shift relative to the incident wave propagating in the channel 110. This will result in an interference phenomenon visible on the graph associated with FIG. 5 showing, in addition to a main peak related to the Helmholtz effect, a dampening by thirteen decibels at the frequency 5175 Hz.

Figure 6:
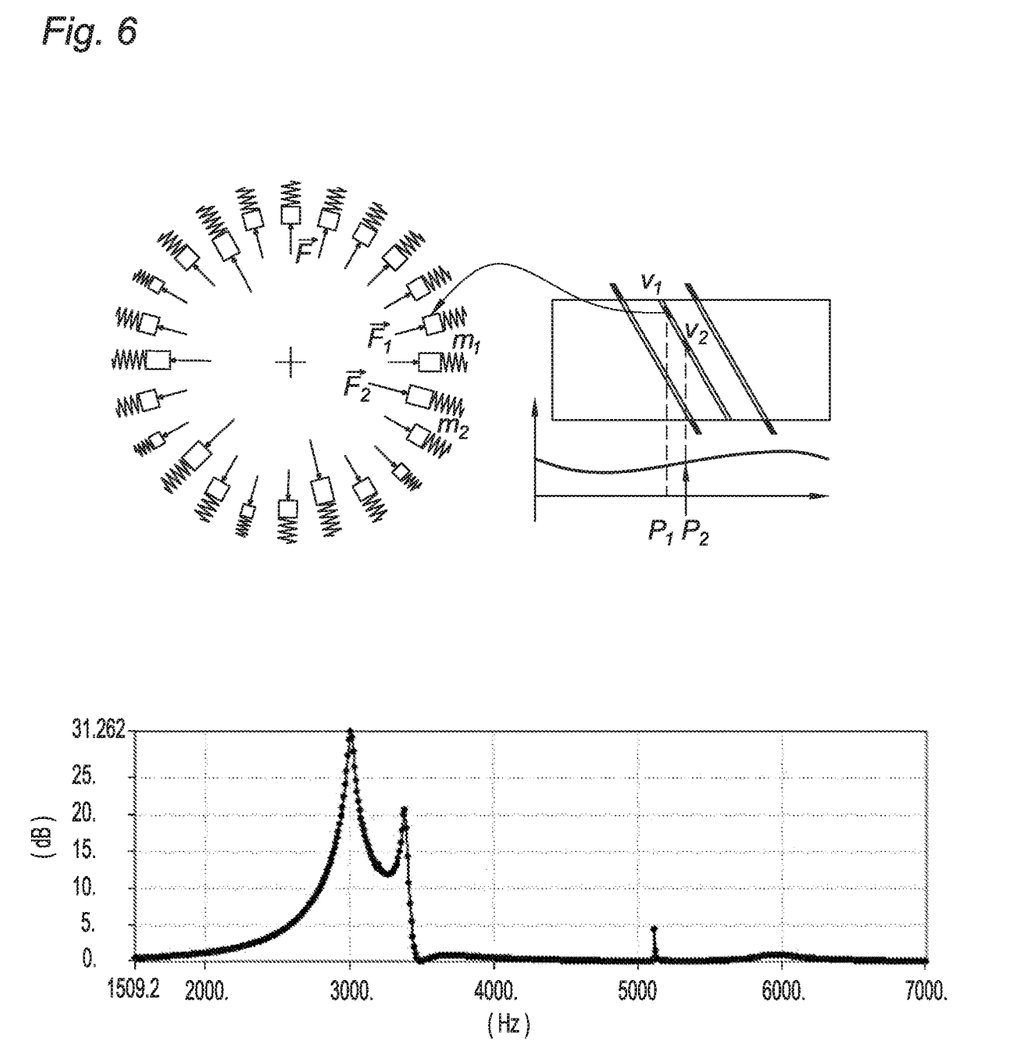
FIG. 6 represents a modeling in accordance with FIG. 4 of a third resonator configuration and the corresponding graph.

As regards the third modeling illustrated in FIG. 6, the slot 14 is further inclined with respect to a plane orthogonal to the reference axis X. The inclination of the slot 14 features two additional effects in comparison with the second modeling. On the one hand, the shape of the small cutting volumes of the neck 14 varies circumferentially, therefore the corresponding masses also vary. On the other hand, the inclination of the slot has as a consequence that each small volume v1, v2 do not perceive the same excitation pressure by the incident acoustic pressure wave. Hence, the masses do not therefore perceive the same pressure forces. The small volumes v1, v2 undergo pressures P1 and P2 which change the forces F1 and F2 on the masses m1 and m2. The graph of FIG. 6 illustrates a curve comprising a main peak with a width larger than the width of the peak of FIG. 5 having a double peak, the first peak corresponding to the Helmholtz effect and the second peak corresponding to the interference effect as well as a third peak corresponding to a harmonic related to the fundamental frequency of the interference effect of the second peak.

Figure 7:
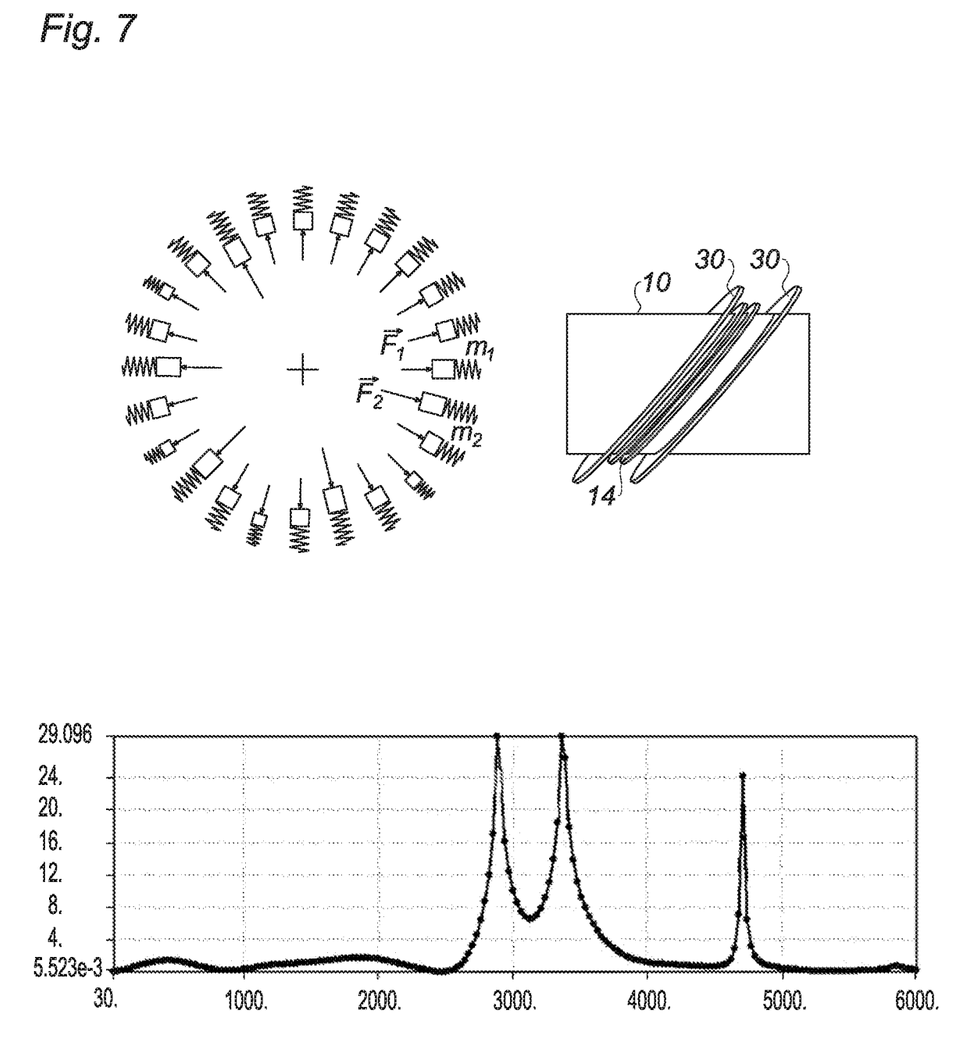
FIG. 7 represents a modeling in accordance with FIG. 4 of a fourth resonator configuration and the corresponding graph.

As regards the fourth modeling of FIG. 7 which corresponds to the first embodiment, the slot 14 further has a neck with a height variable according to the circumferential direction. Thus, as shown in FIGS. 1 to 3, in the first embodiment, the circumferential slot 14 is delimited by protruding flanges formed by annular ribs 38 extending radially outwards from a peripheral outer wall of the insert 20. The variation of the height of the neck 14 adds an additional effect which is the variation of the small elementary volumes v representing the mass m due to the circumferential variation of the height of the neck 14. This effect produces an additional peak related to an interference effect due to the variation of the height of the neck 14. The graph of FIG. 7 illustrates a curve comprising two main peaks at relatively close frequencies, a frequency related to the Helmholtz effect and a frequency related to the interference effect and a secondary peak corresponding to a harmonic related to the fundamental frequency of the interference effect.

Figure 8:
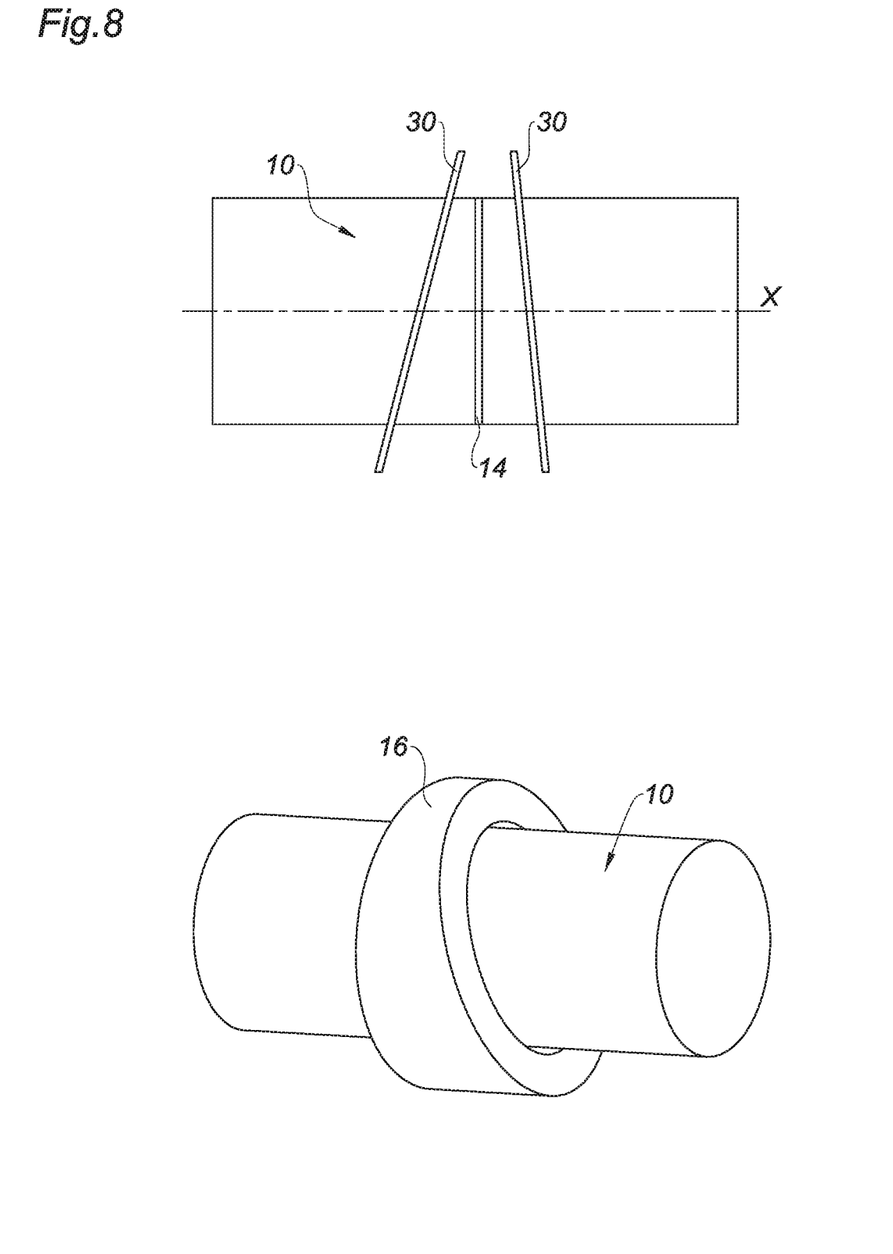
FIG. 8 illustrates a resonator according to a second embodiment of the invention and a corresponding modeling of the volume of the resonance chamber of the resonator.
Figure 9:
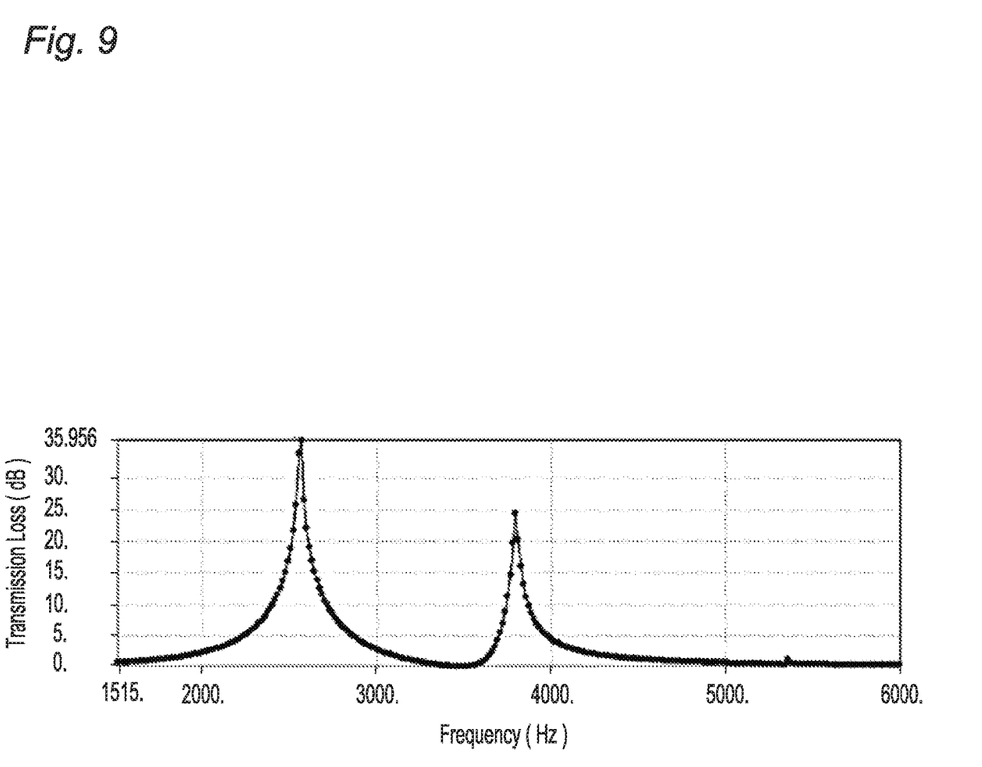
FIG. 9 illustrates the graph of evolution of the dampening in decibel as a function of the frequency in Hertz of the resonator of FIG. 8.

A second embodiment of the invention is represented in FIG. 8. In this second embodiment, the annular walls 30 are inclined in a non-parallel manner. In this case, the volume of the resonance chamber 16 also has a generally asymmetrical shape of revolution represented in FIG. 8. The obtained graph represented in FIG. 9 has a Helmholtz effect peak at 2500 Hz and an interference effect peak at 3795 Hz with a dampening value of 25 decibels.

Figure 10:
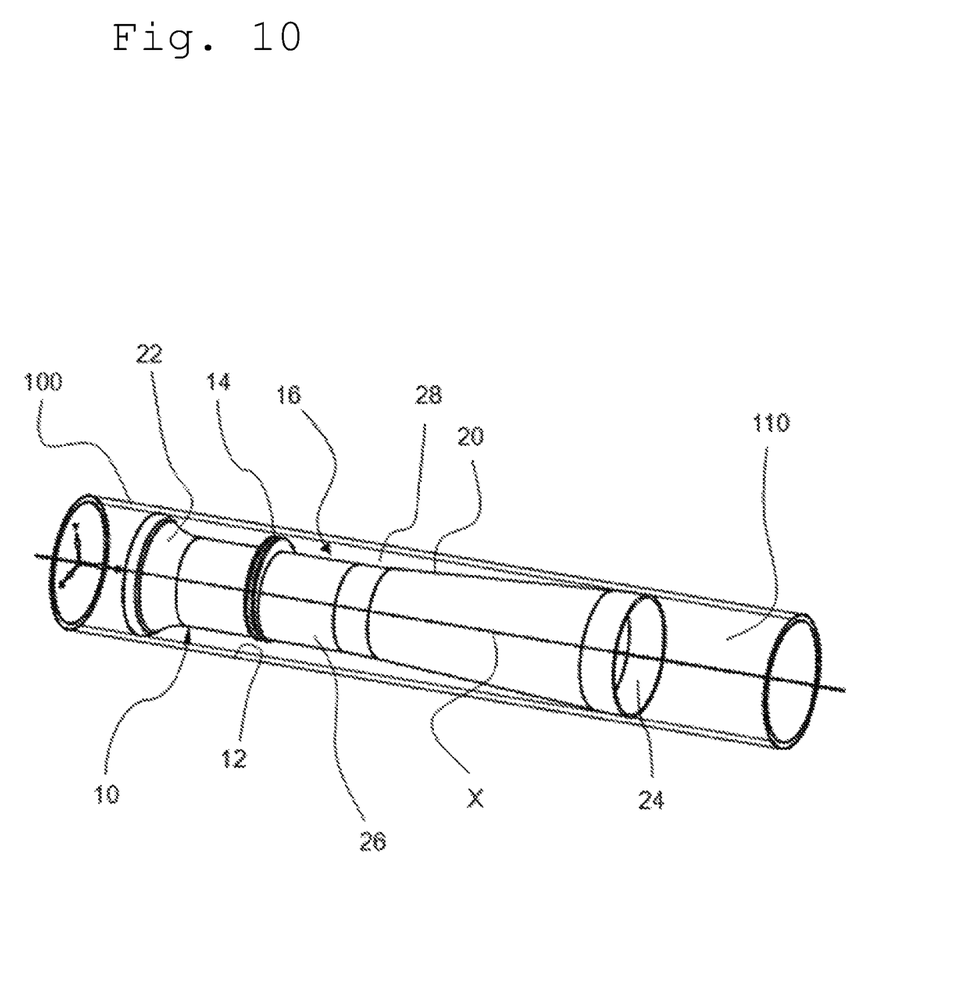
FIG. 10 represents a third embodiment of the resonator according to the invention.

A third embodiment of the invention is represented in FIG. 10. In this third embodiment, the annular compartment 12 is devoid of axial partitioning walls and is formed by the annular space 28 delimited, on the one hand, by the external surface of the insert member 20 and, on the other hand, by the inner surface of the duct 100. The revolution asymmetry of the annular compartment 12 is generated, in this third mode of revolution, by the revolution asymmetry of the communication neck 14. The neck 14 has a circumferentially varying height as in the fourth modeling.

Figure 11:
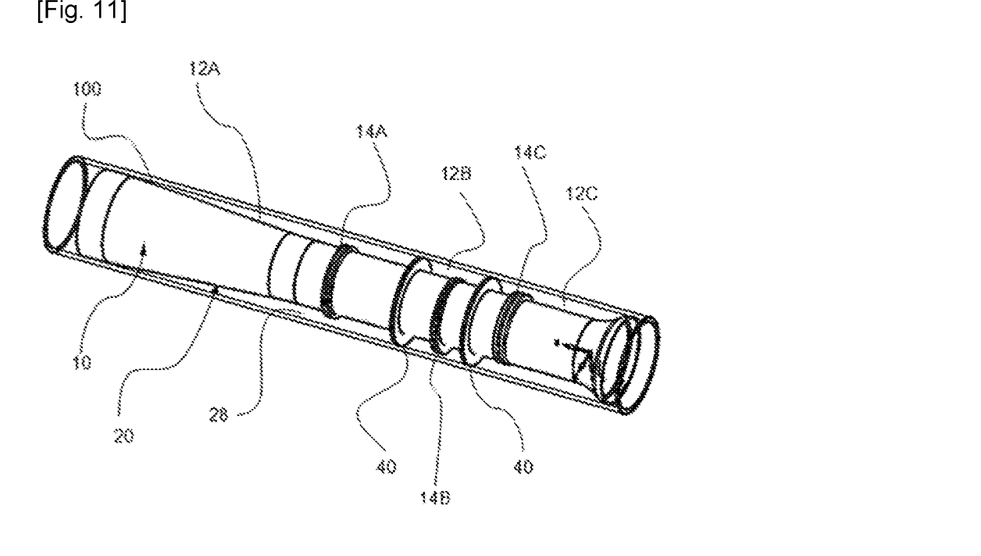
FIG. 11 represents a fourth embodiment of the resonator according to the invention.

A fourth embodiment is represented in FIG. 11. In order to allow for an attenuation of the sound frequencies in different frequency ranges, the resonator 10 delimits, in the annular space 28, a plurality of annular compartments 12A, 12B, 12C, each delimiting resonance chambers with different natural frequencies. The annular compartments 12A to 12C are delimited by axial partitioning annular walls 40, each compartment 12A to 12C comprising respectively an orifice 14A to 14C for communicating with the flow channel 110. In the illustrated example, the resonator 10 comprises an insert member 20 provided with annular walls 40 which are protruding radially outwards. Of course, in accordance with the invention, at least one of the partitioning axial annular walls 40 or one of the annular ribs 38 of the neck 14 have an annular revolution asymmetry.

Figure 12:
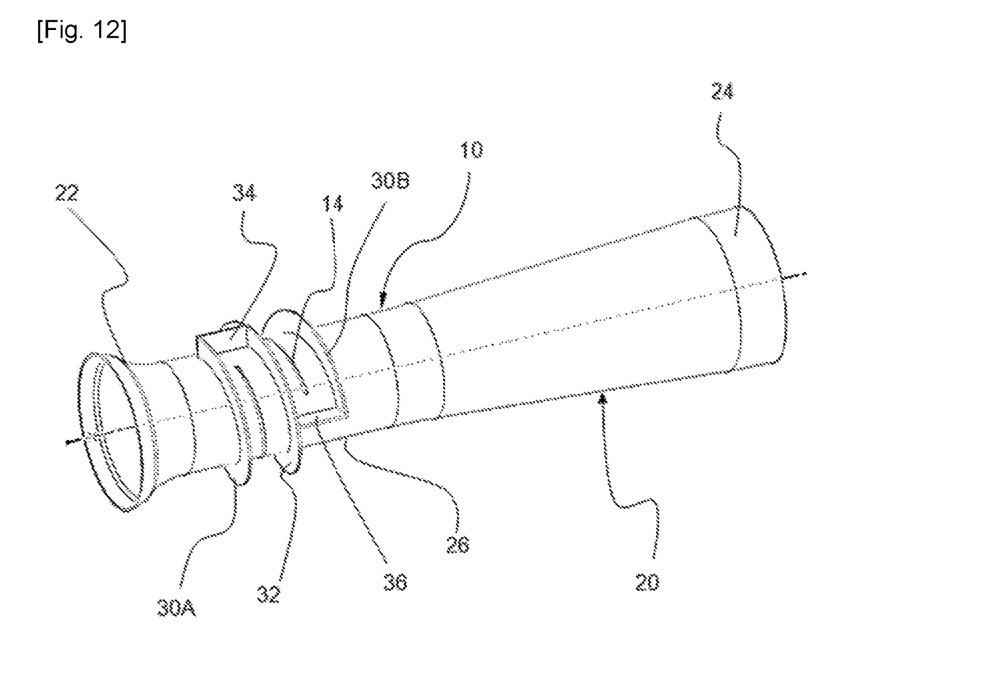
FIG. 12 represents a fifth embodiment of the resonator according to the invention.

FIG. 12 illustrates a fifth embodiment of the invention. In this fifth embodiment, the resonator 10 comprises two respectively upstream 30A and downstream 30B walls (in the fluid flow direction indicated by the arrow) to axially close the resonance chamber 16 and the two walls 30A, 30B are formed by the same continuous helical wall 32. Preferably, the helical wall 32 completes at least one turn, in this example on the external surface of the insert 20. In this example, the helical wall 32 delimits a closed helical volume in a direction of winding of the helix by end walls 34 and 36. Moreover, in a variant which is not illustrated, preferably, the pitch of the helix is variable.

Figure 13:
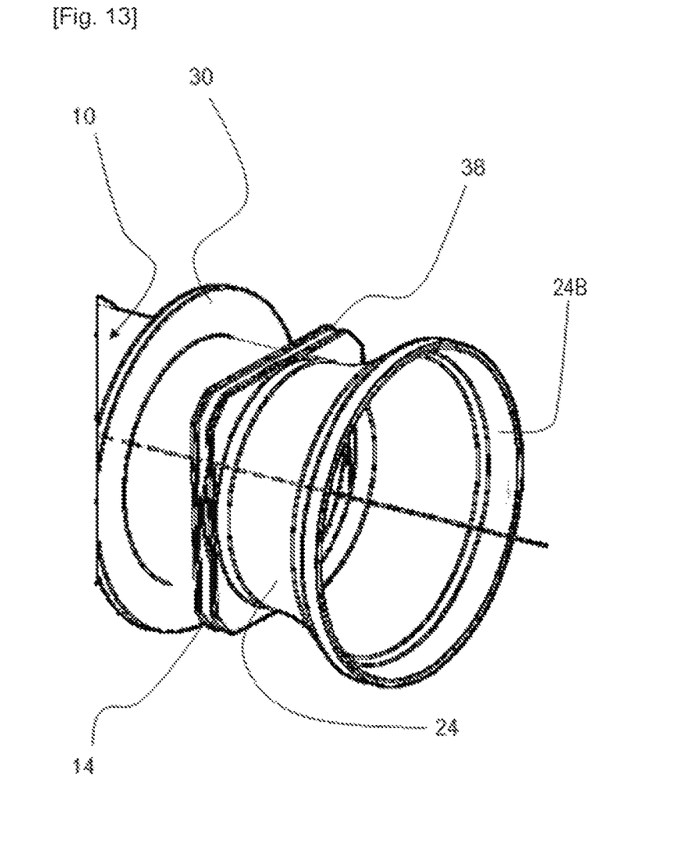
FIG. 13 represents a sixth embodiment of the resonator according to the invention.

FIG. 13 illustrates a sixth embodiment of the invention. In this sixth embodiment, the slot 14 has a variable height neck circumferentially delimited by two radially protruding annular ribs 38 with a square cross-section. This conformation allows increasing the number of harmonics of the fundamental frequency of the resonator 10 of the interference effect.

Figure 14:
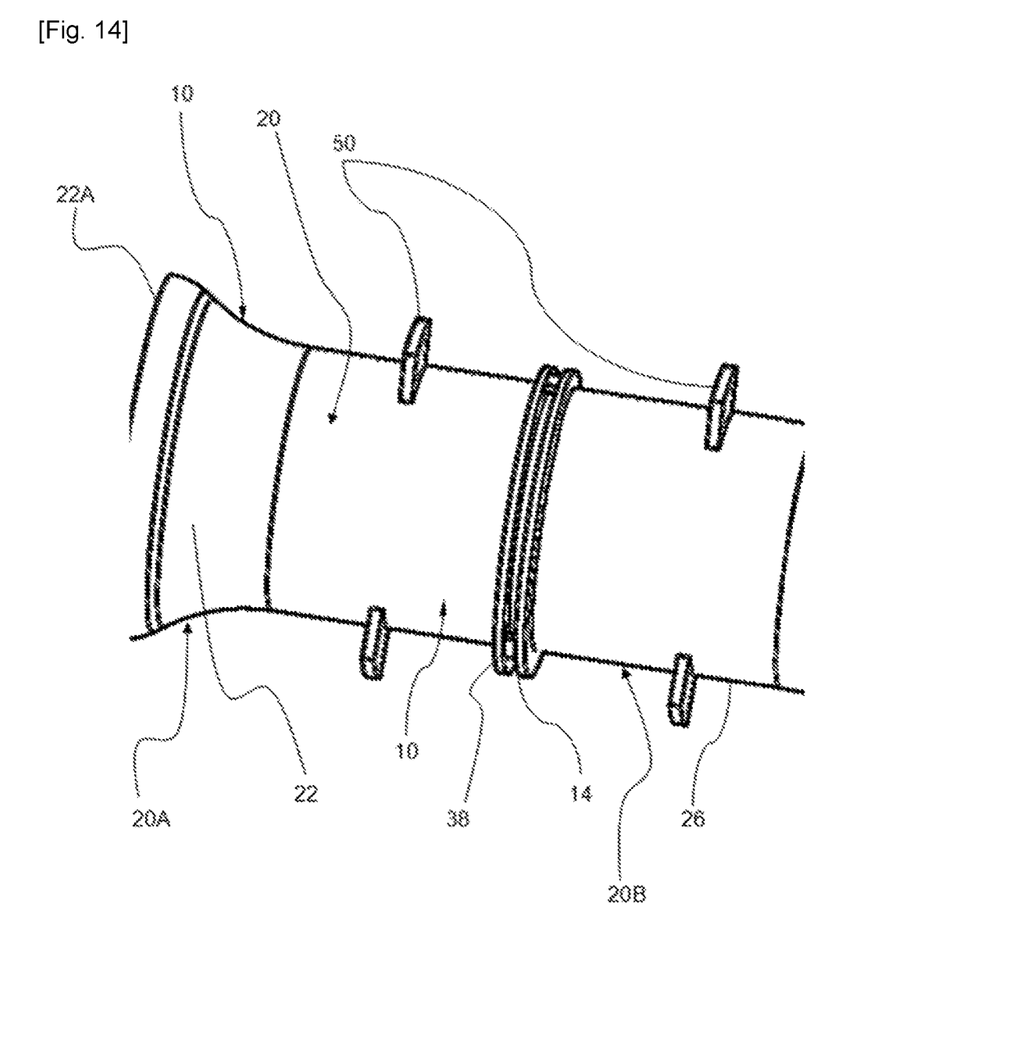
FIG. 14 is a partial perspective view of a resonator according to the third embodiment comprising means for fastening to the duct inside which it is mounted.

FIG. 14 illustrates a seventh embodiment of the invention. In this seventh embodiment, the peripheral body of the resonator 10 comprises members 50 for positioning the insert member 20 inside the duct 100. These positioning members 50 comprise radially protruding bearing ribs disposed on the periphery of the insert member 20. Furthermore, preferably, the insert member 20 is made in the form of two distinct parts identified in FIG. 14 by the references 20A and 20B and interconnected at the level of the communication orifice 14 in the form of a slot by tabs 52.

Of course, the invention is not limited to the previously described embodiments. Other embodiments within the reach of those skilled in the art may also be considered yet without departing from the scope of the invention defined by the claims hereinafter.

The invention claimed is:

1. A resonator for attenuating noise in a duct, the duct having an internal channel for the flow of a fluid and a reference axis, the resonator comprising:
   a generally annular compartment extending around the internal channel, the generally annular compartment forming a generally annular Helmholtz resonance cavity;
   an orifice forming a neck connecting the generally annular Helmholtz resonance cavity with the internal channel, the orifice extending longitudinally along a circumference of the internal channel; and a generally tubular insert member around the reference axis intended to be inserted inside the duct which delimits, internally, the internal channel and, externally, with the duct, a space comprising the generally annular compartment, wherein the generally annular compartment presents an inner structure with a revolution asymmetry about the reference axis, the revolution asymmetry being adapted to generate a phase shift of an acoustic pressure wave propagating in the generally annular Helmholtz resonance cavity relative to an acoustic pressure wave propagating in the internal channel, and wherein the insert member has a tubular intermediate portion and end portions which are respectively convergent and divergent to and from the intermediate portion.

2. The resonator according to claim 1, wherein the orifice is formed by an almost-circumferential or circumferential slot along the perimeter of the internal channel.

3. The resonator according to claim 1, wherein the orifice has a radial thickness, designated by a height of the neck, the height of the neck being circumferentially variable.

4. The resonator according to claim 1, wherein the neck comprises a horn between a throat to which the generally annular Helmholtz resonance cavity is connected and a mouth open onto the internal channel, the shape of the horn defining an expansion function with its section increasing between the throat and the mouth, in particular a linear, exponential, conical or any function.

5. The resonator according to claim 1, wherein the inner structure comprises a generally radially protruding annular wall, the generally radially protruding annular wall being shaped so as to produce the revolution asymmetry.

6. The resonator according to claim 5, wherein the generally radially protruding annular wall is an annular rib protruding radially inwards the generally annular Helmholtz resonance cavity axially delimiting a side of the orifice and having an inclination with respect to a radial plane orthogonal to the reference axis.

7. The resonator according to claim 5, wherein the generally radially protruding annular wall is an axial end wall of the generally annular Helmholtz resonance cavity which extends obliquely at a non-zero angle $\alpha$ with a radial plane orthogonal to the reference axis.

8. The resonator according to claim 1, comprising two respectively proximal and distal walls to axially close the generally annular Helmholtz resonance cavity, the two walls being formed by a same continuous helical wall.

9. The resonator according to claim 8, wherein the helical wall completes at least one turn.

10. The resonator according to claim 8, wherein the helical wall delimits a closed helical volume in a winding direction of the helix by end walls.

11. The resonator according to claim 1, comprising a plurality of adjacent annular compartments delimiting a plurality of adjacent resonator chambers formed in the axial direction, each being connected to the internal channel by at least one communication orifice.

* * * * *